(12) United States Patent
Ashihara

(10) Patent No.: US 6,414,628 B1
(45) Date of Patent: Jul. 2, 2002

(54) METHOD OF DETECTING FAULT OF RADAR APPARATUS USING MOVEMENT DISTANCE AND RADAR APPARATUS FOR THE SAME

(75) Inventor: Jun Ashihara, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/494,003

(22) Filed: Jan. 28, 2000

(30) Foreign Application Priority Data

Feb. 5, 1999 (JP) .............................. 11-029240

(51) Int. Cl.[7] .............................. G01S 7/40; G01S 13/93
(52) U.S. Cl. ..................... 342/173; 342/70; 342/104; 342/109; 342/115; 342/118; 342/128; 342/165; 342/195
(58) Field of Search ................... 342/27–32, 41–51, 342/61–72, 104, 107, 115, 117, 118, 147, 165, 169–175, 195, 196, 128–133, 192–194, 109

(56) References Cited

U.S. PATENT DOCUMENTS 3,703,702 A * 11/1972 Arai .................... 342/371 X
4,180,816 A * 12/1979 Endo et al. ................ 342/70
5,432,516 A * 7/1995 Cherry et al. .............. 342/28
RE36,095 E    2/1999 Urabe et al. .............. 342/133
5,945,942 A * 8/1999 Artis et al. ................ 342/165
6,147,637 A * 11/2000 Morikawa et al. .......... 342/70

FOREIGN PATENT DOCUMENTS

EP          0841040         5/1998
JP          688870 A    *  3/1994    ............ G01S/7/40

* cited by examiner

Primary Examiner—Bernarr E. Gregory
(74) Attorney, Agent, or Firm—Carrier, Blackman & Associates, P.C.; Joseph P. Carrier; William D. Blackman

(57) ABSTRACT

A radar apparatus mounted on a vehicle includes a detecting section and a fault determining section. The detecting section includes a radar unit and detects a detection object using radar wave radiated from a radar unit toward the detection object and reflected radar wave from the detection target to the radar unit. The fault determining section determines whether any fault has occurred in the radar unit, based on the detecting result of the detection object and a movement distance of the vehicle, and generates a fault detection signal, when it is determined that any fault has occurred in the radar unit.

26 Claims, 4 Drawing Sheets

METHOD OF DETECTING FAULT OF RADAR APPARATUS USING MOVEMENT DISTANCE AND RADAR APPARATUS FOR THE SAME

This application is related to application Ser. No. 09/250,376, filed Feb. 16, 1999, now U.S. Pat. No. 6,075,479.

BACKGROUND OF THE INVENTION

1. Field of the Invention

The present invention relates to a method of detecting any fault of radar apparatus mounted on a vehicle using a movement distance of the vehicle, and a radar apparatus for the same.

2. Description of the Related Art

A radar apparatus mounted on a vehicle is conventionally made a practical use, to detect an obstacle in a relatively short distance. By using the radar apparatus, it is possible to avoid collision of the vehicle with obstacles such as an electric light pole and a block wall when the vehicle is put in a garage.

Also, in recent years, the study for coming to practical use is carried out of a radar apparatus to detect a detection object in relatively long distance in a high speed and in a high precision. By using the radar apparatus, it is possible to prevent the collision of the vehicle with a preceding vehicle. The radar apparatus detects a moving body running at high speed such as a vehicle running in front of the vehicle and a coming vehicle as a main target. Therefore, a detection area is generally set to a relatively narrow range in front of the vehicle.

Also, in such a radar apparatus, it is necessary to carry out a detecting process of a preceding vehicle at high speed in correspondence to the velocity of the vehicle. In this case, the distance measuring range must cover a range from the close distance of tens of centimeters to about hundreds of meters from the vehicle. Therefore, a radar apparatus is proposed in which transmitting means radiates a sharp directional radar beam to the preceding vehicle and receiving means receives a reflected beam from the preceding vehicle.

In U.S. Pat. No. RE 36,095, for example, a multi-beam radar apparatus is proposed which uses a high frequency radio wave beam of a millimeter band. In a radar apparatus of this technique, radar beams are radiated to overlap spatially using a plurality of transmitting and receiving sections, and the combinations of the transmitting and receiving sections are changed to improve the detection precision.

Also, in EP 840,140 A1, for example, a scan beam radar apparatus is proposed which uses a high frequency radio wave beam in the millimeter band as the radar wave. In this technique, the radio wave beam is radiated from a primary emitter and is scanned by a rotating reflector, and a reflection beam from the reflector is converged by a dielectric lens, to reduce an expansion angle. Thus, the radio wave beam is radiated to the front direction of the vehicle.

However, in the multi-beam radar apparatus having a plurality of transmitting sections and a plurality of receiving sections, a peculiar detection area is defined for every combination of the transmitting section and the receiving section. Also, the position of a detection object, i.e., an azimuth angle and a distance from the vehicle are calculated by synthesizing reception signals for the respective combinations of the transmitting section and the receiving section. For this reason, the calculated position of the detection object is different from the actual position of the detection object, when any of the plurality of receiving sections and the plurality of transmitting sections is degraded in sensitivity.

Also, in the scan beam radar apparatus, because a single transmission circuit and a single reception circuit are used, an azimuth angle error is difficult to be generated unlike the above multi-beam radar apparatus. However, the detection sensitivity reduces uniformly over all the azimuth angles due to the degradation of the transmitting circuit or the receiving circuit. Therefore, the distance measuring range for the detection object becomes narrow.

Also, in these conventional radar apparatus, the following matters are necessary to measure sensitivity of the radar apparatus for detection of the degradation of the transmitting or receiving circuit. First, the vehicle with the radar apparatus mounted must be carried to an examination environment in which a reference subject is installed. There, a radar beam is transmitted from an examination location to the stationary reference subject and the reflected signal is received. Thus, the sensitivity of the radar apparatus is detected based on the received signal. Therefore, the regular check is necessary in the conventional radar apparatus. This is inconvenient to the user.

SUMMARY OF THE INVENTION

Therefore, an object of the present invention is to provide a method of detecting a fault of a radar apparatus, in which any fault of the radar apparatus mounted on a vehicle can be detected in a usual running state of the vehicle, and a radar apparatus for the same.

Another object of the present invention is to provide a method of detecting a fault of a radar apparatus, in which erroneous detection of a position of a detection object can be avoided, and a radar apparatus for the same.

Still another object of the present invention is to provide a method of detecting a fault of a radar apparatus, in which a detecting operation of any fault of the radar apparatus can be selectively started or stopped, and a radar apparatus for the same.

Yet still another object of the present invention is to provide a method of detecting a fault of a radar apparatus, in which any fault of the radar apparatus can be informed to a passenger of the vehicle, and a radar apparatus for the same.

It is also an object of the present invention to provide a method of detecting a fault of a radar apparatus, in which a detecting operation of any fault of the radar apparatus can be executed to received signals of channels other than fault channels, and a radar apparatus for the same.

Another object of the present invention is to provide a method of detecting a fault of a radar apparatus, in which a detecting operation of any fault of the radar apparatus can be executed based on the detection of a detection object and the movement distance of the vehicle, and a radar apparatus for the same.

Still another object of the present invention is to provide a method of detecting a fault of a radar apparatus, in which a detecting criteria of any fault of the radar apparatus can be changed based on the peripheral circumstance of the running vehicle, and a radar apparatus for the same.

In order to achieve an aspect of the present invention, a radar apparatus mounted on a vehicle includes a detecting section and a fault determining section. The detecting section includes a radar unit and detects a detection object using radar wave radiated from a radar unit toward the detection object and reflected radar wave from the detection target to the radar unit. The fault determining section determines whether any fault has occurred in the radar unit, based on the detecting result of the detection object and a movement distance of the vehicle, and generates a fault detection signal, when it is determined that any fault has occurred in the radar unit.

Here, the radar apparatus mounted on a vehicle may further include a state setting switch operated by a passenger of the vehicle to start or stop the fault determining section.

Also, the radar apparatus mounted on a vehicle may further include an alarm section outputting an alarm in response to the fault detection signal.

Also, the fault determining section is always started when the vehicle is started.

Also, the fault determining section may include a counter and a determining section. The counter counts the movement distance of the vehicle, and the counter is reset in response to the detection of the detection object as the detecting result. The determining section checks whether the counter reaches a predetermined value, and determining that any fault has occurred in the radar unit, to generate the fault detection signal, when the counter reaches the predetermined value.

Also, the fault determining section may include a counter and a determining section. The counter counts the movement distance of the vehicle when a power spectrum of the reflected radar wave does not contain any component with an intensity value larger than a predetermined intensity value. Also, the counter is reset when the power spectrum of the reflected radar wave contains any component with an intensity value larger than the predetermined intensity value. The determining section checks whether the counter reaches a predetermined value, and determining that any fault has occurred in the radar unit, to generate the fault detection signal, when the counter reaches the predetermined value. In the above cases, the fault determining section may further include a distance switch operated by a passenger of the vehicle to set the predetermined value to one of a plurality of distances which are different from each other.

Also, the detecting section may include the radar unit and a position calculating section. The radar unit includes a beam transmitting section radiating the radar wave, and a beam receiving section receiving the reflected radar wave from the detection object. The position calculates section calculating the position of the detection object from the radar wave and the reflected radar wave.

Also, the radar wave includes a plurality of radar beams, and the reflected radar wave includes a plurality of reflected radar beams. In this case, a combination of one of the plurality of radar beams and one of the plurality of reflected radar beams is associated with a channel. Also, the fault determining section determines whether any fault has occurred, for every channel, to generate the fault detection signal.

Also, the radar wave may include a plurality of radar beams, and the reflected radar wave may include a plurality of reflected radar beams. In this case, the radar unit includes a plurality of beam transmitting circuits, each of which radiates the radar beam, and a plurality of beam receiving circuits, each of which receives the reflected radar beam. Also, each of channels is associated with a combination of one of the plurality of beam transmitting circuits and one of the plurality of beam receiving circuits corresponding to the beam transmitting circuit. Or, each channel is associated with a combination of one of the plurality of beam transmitting circuits and one of the plurality of beam receiving circuits adjacent to the beam transmitting circuit. Also, the fault determining section determines whether any fault has occurred, for every channel, to generate the fault detection signal. In this case, the detecting section detects a position of the detection object from a power spectrum of the radar beams and the reflection radar beams for all the channels other than channels specified by the fault detection signals.

Also, the fault determining section includes one of an odometer and a trip meter to output the movement distance. Otherwise, the fault determining section may include a section calculating a velocity of the vehicle using a Doppler shift quantity between the radar wave and the reflected radar wave, and calculating the movement distance of the vehicle based on the calculated velocity and a time.

In order to another aspect of the present invention, a method of detecting a fault in a radar apparatus mounted on a vehicle is achieved by detecting a detection object is using radar wave radiated from a radar apparatus toward the detection object and reflected radar wave from the detection target to the radar apparatus; and determining whether any fault has occurred in the radar unit, based on the detecting result of the detection object and a movement distance of the vehicle, and generating a fault detection signal, when it is determined that any fault has occurred in the radar unit.

Here, the determining operation may be selectively started or stopped. Also, it is desirable that the determining operation is always started when the vehicle is started.

Also, an alarm may be outputted in response to the fault detection signal.

Also, in the determining, the movement distance of the vehicle is counted. The counted value is reset in response to the detecting result of the detection object. It is checked whether the counter reaches a predetermined value. It is determined that any fault has occurred in the radar unit, to generate the fault detection signal, when the counted value reaches the predetermined value.

Also, in the determining, the movement distance of the vehicle is counted when a power spectrum of the reflected radar wave does not contain any component with an intensity value larger than a predetermined intensity value. The counted value is reset when the power spectrum of the reflected radar wave contains any component with an intensity value larger than the predetermined intensity value. It is checked whether the counter reaches a predetermined value, and it is determined that any fault has occurred in the radar unit, to generate the fault detection signal, when the counted value reaches the predetermined value. In the above cases, one of a plurality of distances which are different from each other is selected as the predetermined value.

Also, the radar wave may include a plurality of radar beams, and the reflected radar wave may include a plurality of reflected radar beams. A combination of one of the plurality of radar beams and one of the plurality of reflected radar beams is associated with a channel. In the determination, it is determined whether any fault has occurred, for every channel, to generate the fault detection signal.

Also, the radar wave may include a plurality of radar beams, and the reflected radar wave may include a plurality of reflected radar beams. In this case, each of channels is associated with a combination of one of the plurality of radar beams and one of the plurality of reflected radar beams corresponding to the radar beam. Or, each channel is associated with a combination of one of the plurality of radar beams and one of the plurality of reflected radar beams adjacent to the radar beam. In the determination, it is determined whether any fault has occurred, for every channel, to generate the fault detection signal. In this case, the detection may be accomplished by detecting a position of the detection object from a power spectrum of the radar beams and the reflection radar beams for all the channels other than channels specified by the fault detection signals.

Also, in the determination, a velocity of the vehicle is calculated using a Doppler shift quantity between the radar wave and the reflected radar wave, and the movement distance of the vehicle is calculated based on the calculated velocity and a time.

DESCRIPTION OF THE PREFERRED EMBODIMENTS

Hereinafter, the radar apparatus of the present invention will be described below in detail with reference to the attached drawing.

Figure 3:
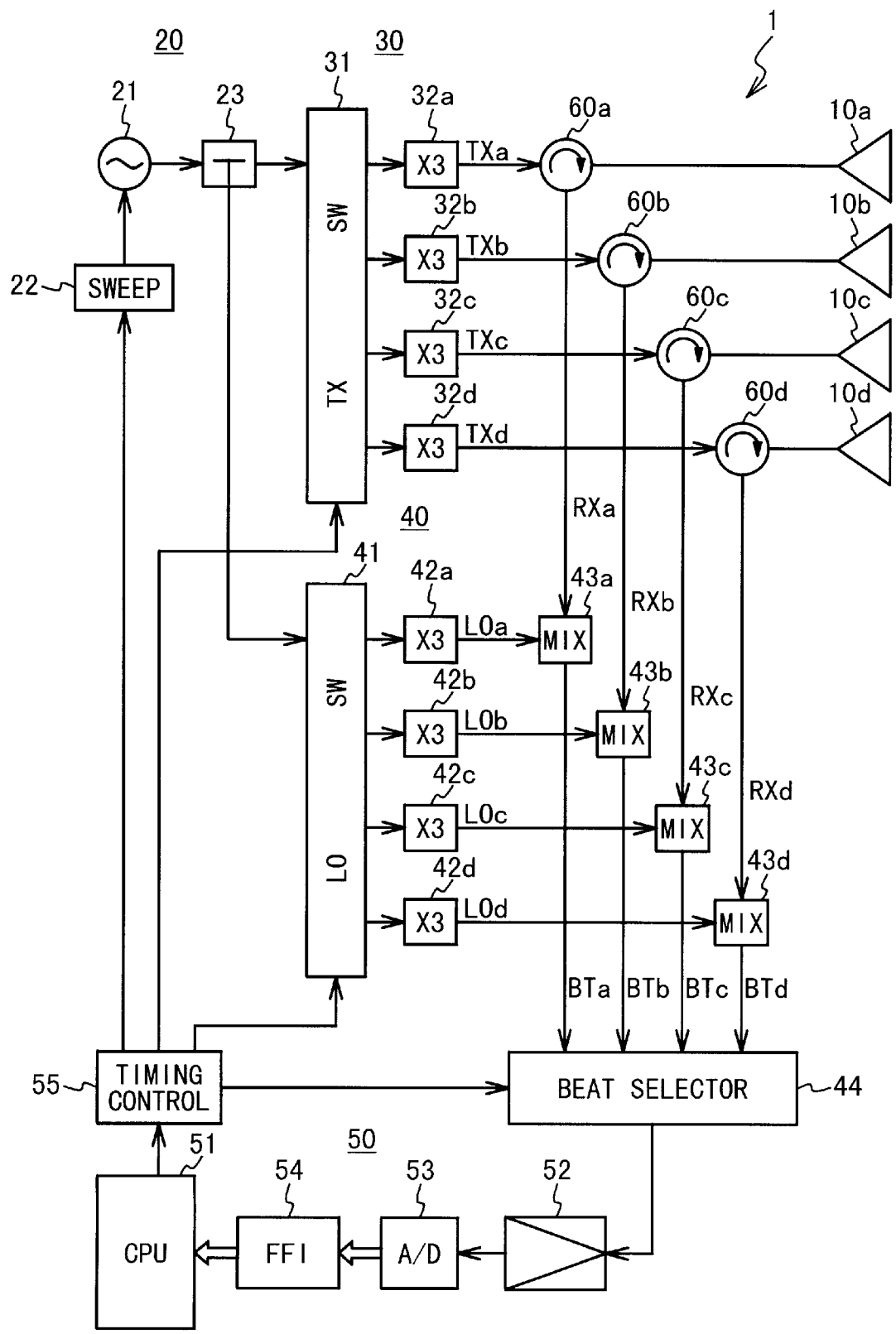
FIG. 3 is a block diagram showing the structure of the radar apparatus of the present invention in detail.

FIG. 3 is a block diagram showing the structure of an FM-CW multi-beam radar apparatus of a time division type according to the first embodiment of the present invention. First, referring to FIG. 3, the structure of the radar apparatus 1 will be described. The radar apparatus 1 in the first embodiment is composed of four antennas 10a to 10d, an FM wave generating circuit 20, a transmitting section 30 of a 4-channel structure, a receiving section 40 of a 4-channel structure, a detection and control unit 50, and four directional couplers 60a to 60d.

Figure 4:
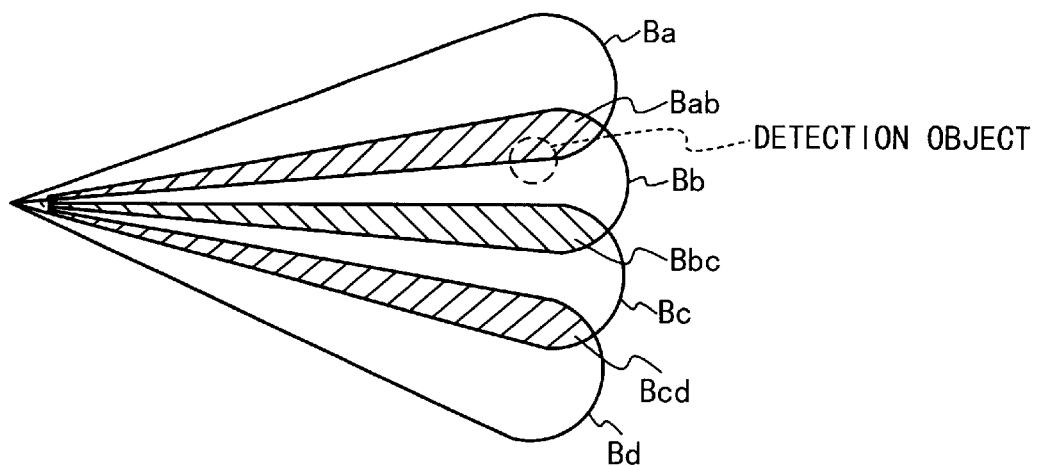
FIG. 4 is a conceptual diagram to show a radar beam radiation pattern of the radar apparatus.

For example, the antennas 10a to 10d are composed of an offset defocus parabolic multi-beam antenna which has a beam radiation pattern shown by radiation areas Ba to Bd in FIG. 4.

The FM wave generating circuit 20 is composed of a voltage controlled oscillator 21, a sweep circuit 22, and a power distributing circuit 23. The sweep circuit 22 generates a triangular waveform-shaped modulation voltage under the control of the detection and control unit 50 to supply to the voltage controlled oscillator 21. The voltage controlled oscillator 21 generates a radio wave at the semi-millimeter wave band of about 20 GHz or about 25 GHz as a modulated power signal based on the triangular waveform-shaped modulation voltage. The power distributing circuit 23 distributes the power signal into the transmitting section 30 and the receiving section 40.

The transmitting section 30 is composed of a transmission switching circuit 31 and frequency increasing circuits 32a to 32d. The transmission switching circuit 31 switches the modulated power signal toward the respective antennas 10a to 10d at predetermined timings specified by a timing signal from the detection and control unit 50. Each of the frequency increasing circuits 32a to 32d increases the frequency of the modulated power signal 3 times to convert into FM wave at the millimeter wave band of about 60 GHz or about 75 GHz. The modulated power signals from the frequency increasing circuits 32a to 32d are transferred to the respective antennas 10a to 10d via the four directional couplers 60a to 60d, and radiated from the antennas 10a to 10d, respectively.

The receiving section 40 is composed of a local switching circuit 41, frequency increasing circuits 42a to 42d, mixing circuits 43a to 43d and a beat selector 44. The local switching circuit 41 switches the modulated power signal distributed by the power distributing circuit 23 toward the respective mixing circuits 43a to 43d at predetermined timings specified by a timing signal from the detection and control unit 50. Each of the frequency increasing circuits 42a to 42d converts the frequency of the modulation power signal into the same frequency as the transmitted modulated power signal. The modulated power signal radiated from the antennas 10a to 10d are reflected by a detection object. The reflected signals are received by the antennas 10a to 10d and supplied to the mixing circuits 43a to 43d through the directional couplers 60a to 60d, respectively. The mixing circuits 43a to 43d mix the reflected signals and the modulated power signals supplied from the frequency increasing circuits 42a to 42d and the mixed signals are supplied to the beat selector 44. The beat selector 44 selects one of the mixed signals in response to a timing signal from the detection and control circuit 50.

The detection and control circuit 50 is composed of a processor (CPU) 51a, an amplifier circuit 52, an analog to digital (A/D) converting circuit 53, a Fast Fourier transform circuit (FFT) 54 and a timing control circuit 55. The timing control circuit 55 generates timing control signals in response to a control signal from the processor 51a to supply to the sweep circuit 22, the transmission switching circuit 31, the local switching circuit 41 and the beat selector 44. The amplifier circuit 52 amplifies the signal selected by the beat selector 44. The analog to digital (A/D) converting circuit 53 converts the amplified signal by the amplifier circuit 52 into a digital signal. The fast Fourier transform circuit 54 performs the fast Fourier transformation to the digital signal and supplies the transformation result to the processor 51. The processor 51 detects the position of the detection object and detects any fault of the radar apparatus based on the detected detection object and a movement distance of the vehicle.

The radar waves Txa to Txd are increased in frequency to the FM waves at the millimeter wave band of 60 GHz, for example. Then, the radar waves Txa to Txd are supplied to the antennas 10a to 10d through the directional couplers 60a to 60d at different timings and are radiated from the antennas 10a to 10d toward the detection object, respectively.

The radiated radar waves Txa to Txd are reflected by the detection object and are received by the antennas 10a to 10d as reflected waves Rxa to Rxd, respectively. The reflected waves Rxa to Rxd are separated from the transmission waves by the directional couplers 60a to 60d and supplied to the mixing circuit 43a to 43d, respectively. The modulated power signals are increased to 3 times in frequency by the frequency increasing circuits 42a to 42d and converted into the local FM modulated waves Loa to Lod. The separated waves Rxa to Rxd are synthesized with the local FM modulated waves Loa to Lod at predetermined timings in the mixing circuits 43a to 43d. As a result, beat signals Bta to Btd are generated as the synthetic signals. The beat selector 44 sequentially selects the beat signals Bta to Btd outputted from the mixing circuits 43a to 43d to output to the control circuit 50.

The selected beat signal Bta to Btd is amplified by the amplifier circuit 52 and then are converted into the digital signal by the analog to digital conversion circuit 53. Moreover, the digital signal is converted by the fast Fourier transform circuit (FFT) 54. Then, the signal subjected to the fast Fourier transform is outputted to the processor (CPU) 51 as the power spectrum which has peak components at the frequencies which corresponds to the beat frequencies.

The processor 51 calculates a propagation delay time of the FM wave to the peak frequency for each of components of the inputted power spectrum which has power intensity higher than a predetermined level. The processor 51 calculates a distance to the detection object based on the calculated propagation delay times for the respective components. Also, the processor 51 carries out the weighting and averaging calculation to the peak intensities of the components of the power spectrum to calculate the azimuth of the detection object. Thus, the position and azimuth of the detection object are calculated.

It should be noted that as shown in FIG. 4, the radar beams Ba to Bd are provided to overlap spatially. Also, the switching timings of the transmission switching circuit 31 and local switching circuit 41 are suitably set. Thus, the radar apparatus 1 is possible to function as a 7-beam multi-beam radar apparatus by the radar waves of four pairs (the 4-channel structure).

In addition to the beat signals for four pairs of the radar waves, there is a beat signal Btab. For example, a beat signal Btaa is obtained by synthesizing the local signal Loa with the radar beam signal which is transmitted from and received by the antenna 10a. Also, a beat signal Btbb is obtained by synthesizing the local signal Lob with the radar beam signal which is transmitted from and received by the antenna 10b. However, the beat signal Btab is generated by synthesizing the local wave Lob with the radar beam signal radiated from the antenna 10a and received by the antenna 10b. The beat signal Btab is used to analyze the overlapping portion of the above radar beams. The same effect as a "virtual antenna" is provided between the antenna 10a and the antenna 10b.

Figure 5:
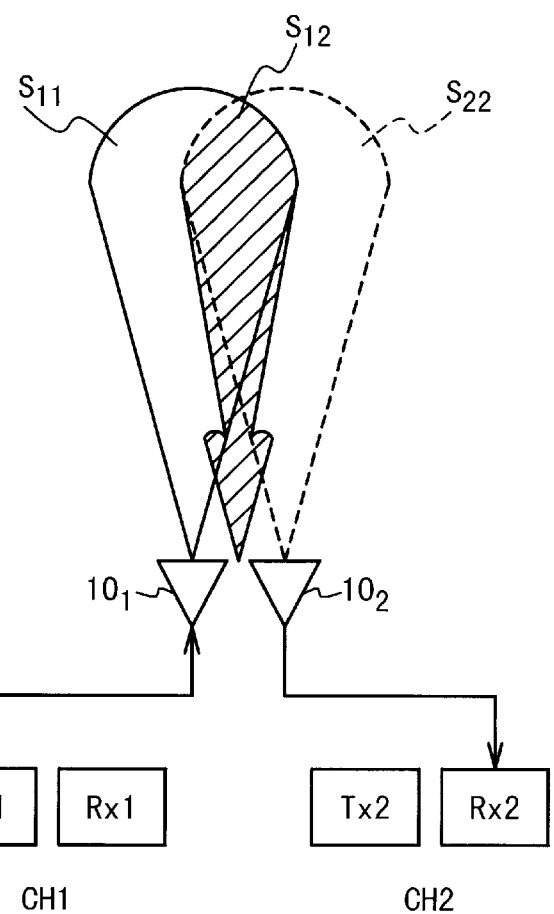
FIG. 5 is a conceptual diagram to show a so-called virtual antenna which is formed in a radar beam overlapping region in the above radar apparatus.

FIG. 5 is a diagram to simply explain the virtual antenna. Optional two channels are taken out from FIG. 4 as ch1 and ch2. The sensitivity characteristic of each radar beam formed in the combination of a transmission channel and a reception channel as described above is schematically shown. In this embodiment, a case where the radiation radar beams of the respective channels have substantially the same beam pattern is described. In this case, the sensitivity characteristic S11 shown in the figure by a solid line shows a distribution of detection sensitivities (individual sensitivities of channel 1), when the radar beam is transmitted from the transmitter Tx1 of channel 1 and is received by the receiving circuit Rx1 of the same channel 1. The sensitivity characteristic S22 shown by the dotted line shows a distribution of detection sensitivities (individual sensitivities of channel 2) when the radar beam is transmitted from the transmitting circuit Tx2 of the channel 2 adjacent to the channel 1 and having a spatial beam overlapping portion, and received by the receiving circuit Rx2 of the channel 2. The above two sensitivity characteristics S11 and S22 have substantially the same characteristic.

The sensitivity characteristic S12 shown by an alternate long and short dash line shows a distribution of detection sensitivities (neighborhood sensitivities from channel 1 to channel 2) when the radar wave is transmitted from the transmitting circuit Tx1 of the channel 1 and is received by the receiving circuit Rx2 of the channel 2. This signal path is shown by an arrow in the figure. The distribution of detection sensitivities has the same sensitivity as each distribution of individual sensitivities in the overlapping portion of the channel 1 and the channel 2, and has a weak side robe in the non-overlapping portion.

By the way, the multi-beam radar apparatus is composed of a plurality of transmission channels and a plurality of reception channels as mentioned above. When a component is degraded in either one of channels for the transmitting section 30 or the receiving section 40, the transmission or reception sensitivity is reduced. In this case, an azimuth error is caused in the azimuth angle of the detection object calculated by the processor 51 in accompaniment with the sensitivity reduction. As a result, the calculated position is different from the actual position of the detection object.

Figure 1:
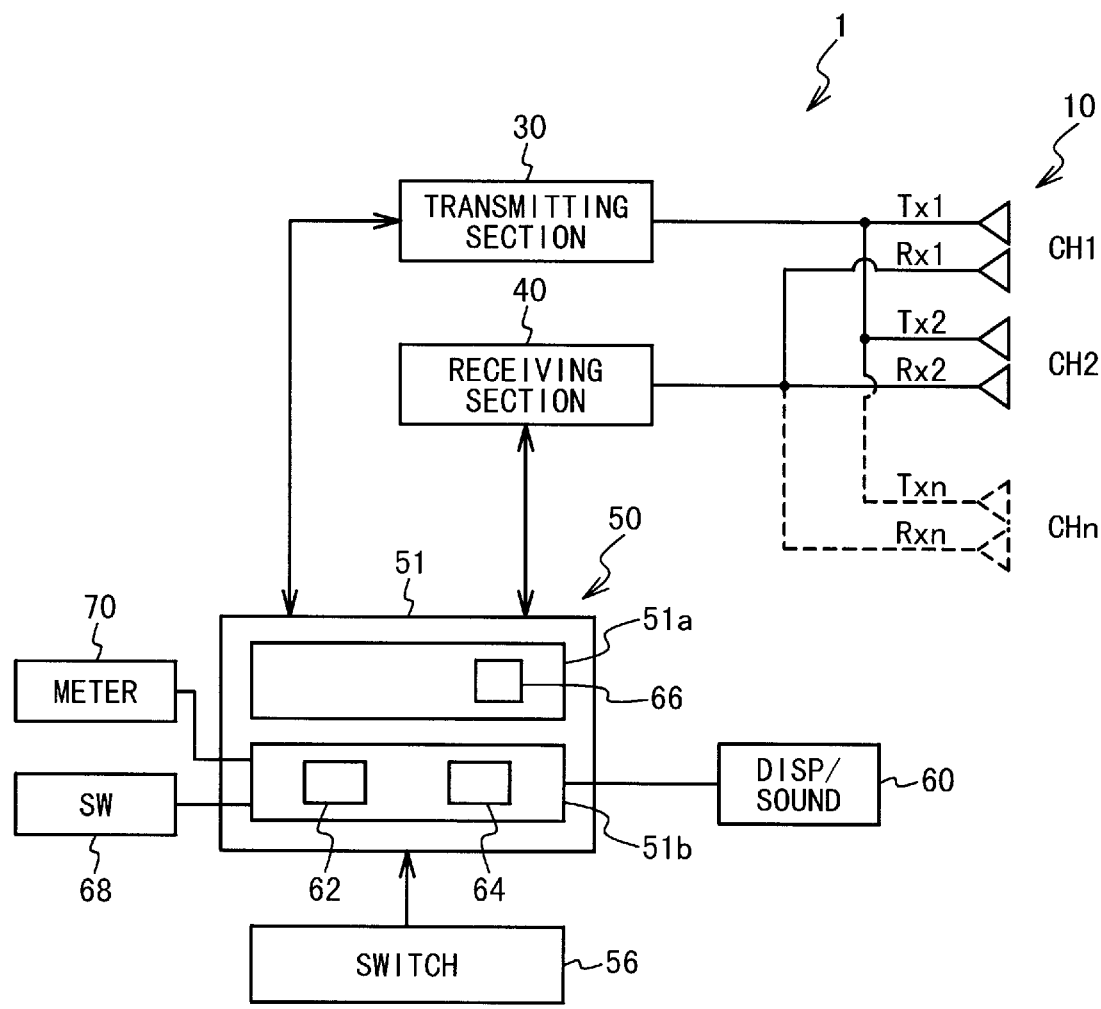
FIG. 1 is a block diagram showing the structure of a radar apparatus according to a first embodiment of the present invention.

In the first embodiment of the radar apparatus according to the present invention, the processor 51 is provided with the position detecting section 51a which detects the movement distance of the vehicle, and the fault determining section 51b, as in the multi-beam radar apparatus simply shown in FIG. 1. The position detecting section 51a includes a distance detecting section 66. The fault determining section 51a includes a counter 62 and a determining section 64.

The fault determining section 51b determines whether or not any fault has occurred in the radar apparatus, based on the movement distance information from the distance detecting circuit 51a and the detection information of the detection object calculated by the processor 51. When the detection object is not detected in the previously set movement distance, the fault determining circuit 51b determines that any fault has occurred in the radar apparatus.

The fault determining section 51b is composed of the counter 62, which counts a movement distance signal from a distance measuring device 70 such as an odometer and a trip meter, just as it is. The device is generally provided for the vehicle. The fault determining section 51b may be composed of a calculator (not shown), which calculates the movement distance from the speed information of the own vehicle which is obtained from the speedometer of the vehicle. Alternatively, the fault determining section 51b may be composed of another calculator (not shown). The other calculator calculates the velocity of the own vehicle from the Doppler shift amount of the FM wave which is transmitted from and received by the radar apparatus, and calculates the movement distance from the calculated velocity and a measurement time.

Figure 2:
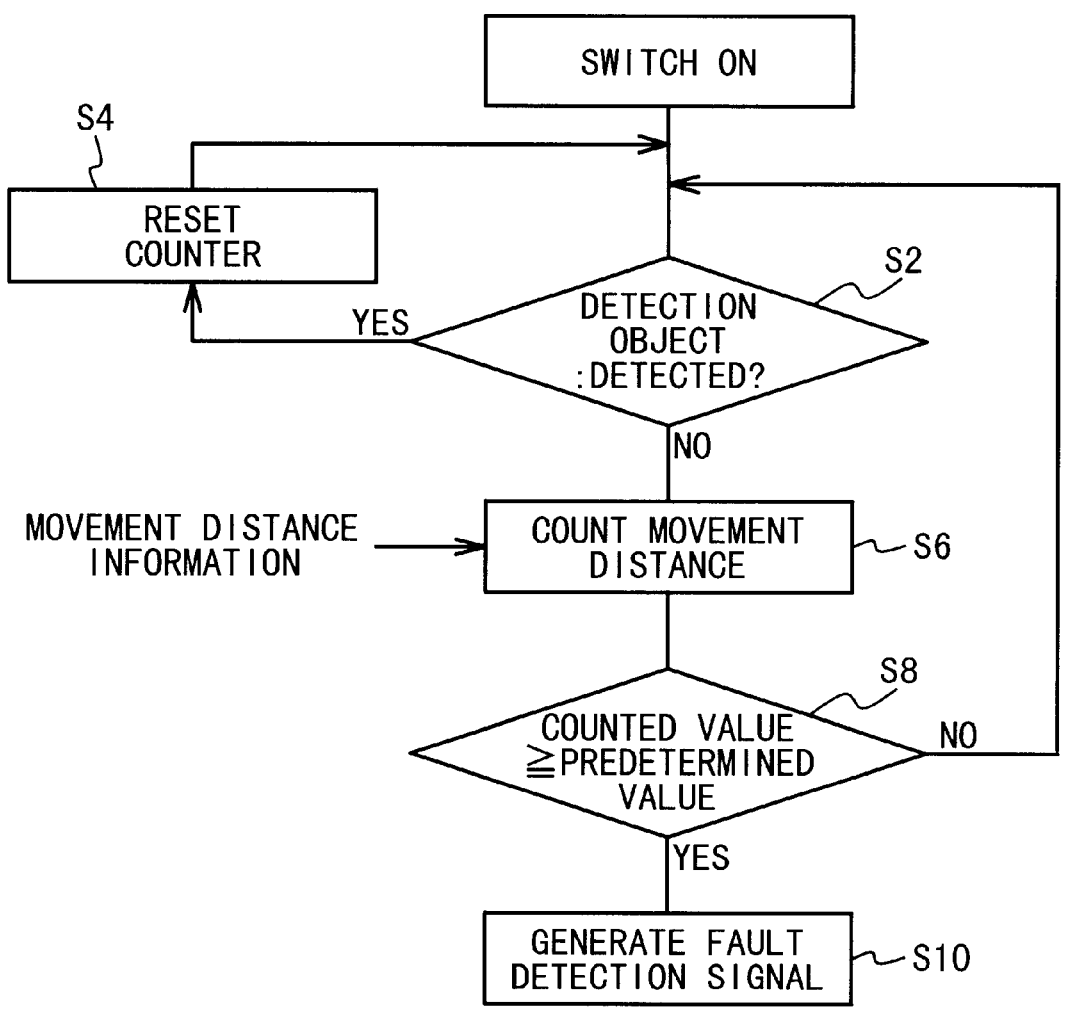
FIG. 2 is a flow chart to show the operation of the radar apparatus according to a first embodiment of the present invention.

The fault determining section 51b carries out the fault determination of the radar apparatus for every channel, i.e., for every combination as the combination of the beam transmitting circuit and the beam receiving circuit. The fault determination may carried out based on the movement distance information from the above distance detecting section 66 of the position detecting section 51a or the detection information of the detection object calculated by the processor 51. The processing flow at this time is shown in FIG. 2.

It is desirable that the fault determining section 51b always monitors in a step S2 whether or not the detection object is detected by the processor 51, when a power supply is turned on. In this case, the fault determining section 51b determines whether or not there is a component of the observed power spectrum which has a peak intensity higher than the predetermined intensity as a threshold level, in the multi-beam radar apparatus. When the detection object is not detected, that is, when a peak frequency is not detected, a movement distance counter 62 continues an increasing operation. When the detection object is detected, that is, when a peak frequency is detected, the movement distance counter 62 is reset to zero in a step S4.

The above increasing operation is continued in the movement distance counter 62 when the count value of the movement distance counter 62 is smaller than a preset fault determination distance Lx in a step S8. The fault determining section 51b determines in a step S10 that any fault has occurred in a channel of the radar apparatus, when the count value of the movement distance counter 62 is equal to or larger than the fault determination distance Lx. The fault determination section 51b carries out the fault detection operation to all the channels and carries out the fault determination of the radar apparatus.

When it is determined that any fault has occurred in the radar apparatus, the fault determination section 51b generates a fault determination signal. The alarm that any fault has occurred in the radar apparatus is displayed on a display and sound unit 60 provided in an instrument panel of the vehicle in response to the fault determination signal such that a passenger of the vehicle can easily see the alarm. Also, according to the necessity, a fault discovered channel is also displayed, and a warning is outputted from the unit 60. When an automobile control system is built using the radar apparatus, the fact which the fault has occurred in the system is outputted. For example, a warning and an alarm are outputted or displayed, or the automobile control may be canceled in response to the warning. Therefore, the passenger of the vehicle is possible to recognize that any fault has occurred in the radar apparatus, without bringing the vehicle in the specific examination environment, even if the sensitivity is reduced with some cause while the vehicle is running. Also, in the radar system, it is possible to determine that the position detection error is generated. Therefore, the problem which is caused based on the erroneous detection of the position of the detection object can be prevented.

It should be noted that the preset fault determination distance Lx is not limited to one. A plurality of fault determination distances Lxn may be set by use of a switch 68. For example, two fault determination distances may be set, e.g., a city center area mode Lx1 and a suburb mode Lx2. Also, the fault determination distance Lx may be updated based on well known mathematical processing such as a weighting and averaging process of the detection distances of the detection object in the environment in which the vehicle is usually used.

Next, the radar apparatus according to the second embodiment of the present invention will be described below. The radar apparatus in the second embodiment is provided with a new determining process of a fault in addition to the radar apparatus in the first embodiment.

In the radar apparatus in the second embodiment, the processor 51 calculates the position of the detection object from the signals other than a signal from a channel which a fault is determined to have occurred by the fault determining section 51b, in the multi-beam radar apparatus in the first embodiment. That is, in the multi-beam radar apparatus, the distance to the detection object is calculated using the plurality of components of the power spectrum corresponding to the plurality of channels which contains the virtual channels. Also, the azimuth angle of the detection object is calculated by carrying out a weighting and averaging process to the peak intensity of the plurality of components of the power spectrum. Therefore, when the sensitivity is degraded or calculation of an azimuth angle is carried out from the power spectrum containing a component from the fault channel in the position detection of the detection object, an error is contained in the calculated distance and azimuth of the detection object. Also, when the position detection is stopped after the display of the effect that the fault has occurred, the function of the automobile control system using the radar apparatus cannot be used.

Therefore, in the radar apparatus according to the second embodiment of the present invention, the processor 51 calculates the position of the detection object from the signals of the channels other than the channel in which the fault is determined to have occurred by the fault determining section 51b.

Next, the radar apparatus according to the third embodiment of the present invention will be described. In the third embodiment, a switch 56 is provided to switch the operation start and operation stop of the fault determining section 51b, in addition to the radar apparatus in the first embodiment or the second embodiment.

The switch 56 may be accomplished using the well known switch. For example, the switches may be used such as a toggle switch in which the ON state and the OFF state are switched by a lever position, and an alternate switch in which the ON state and the OFF state are switched based on a pushing operation. Also, a speech recognition switch may be used in which the ON state and the OFF state are switched based on speech of the passenger of the vehicle. In this case, it is desirable that the fault determining section is automatically turned on, when the radar apparatus is started. Also, it is desirable that a display unit is provided to display that the fault determining section 51b is turned off, when the passenger of the vehicle stops the fault determining section 51b. Also, the display unit is desirably provided on the instrument panel.

By using the switch 56 in this embodiment, the fault determining section 51b can be set to the off state, in the road environment where any effective detection object does not exist, when such road environment is a vast desert zone, a prairie, and a straight line road where there are not a guardrail and an electric light pole at all. In this case, the fault determining operation of the fault determining section 51b can be previously stopped using the switch 56. The erroneous determination of the detection object can be avoided. Also, There is no case that a warning is outputted and an alarm is displayed.

When the running environment returns to the usual running environment from under the above environment, the switch 56 is operated to turn on the fault determining section again. Thus, the above effect of the radar apparatus is accomplished.

It should be noted that the switch 56 may be combined with the mode switch to switch the fault determination distance Lx. For example, the switch states may be set to the city center area mode Lx1, the suburb mode Lx2, and the state that the fault determining section is turned off (or infinite fault determination distance.

In the above description, the radar apparatus of the present invention is applied to the FM-CW multi-beam radar apparatus using a radio wave beam at the millimeter wave band. However, the present invention is not limited to the above embodiments. For example, the present invention can be applied to a pulse radar apparatus and a scan beam radar apparatus, in the same way. Also, the present invention can be applied to the radar apparatus such as a laser radar in which infrared light or ultraviolet light is used as a light medium beam.

What is claimed is:

1. A radar apparatus mounted on a vehicle, comprising:
   a detecting section including a radar unit for detecting objects in a traveling path of the vehicle using radar waves radiated from said radar unit toward said traveling path and any of said radar waves which may be reflected from an object in said traveling path to said radar unit, said detecting section generates a signal corresponding to a detecting result thereof; and
   a fault determining section for determining whether any fault has occurred in said radar unit, based on said signal from said detecting section and a movement distance of said vehicle, and generating a fault detection signal, when it is determined that any fault has occurred in said radar unit.

2. A radar apparatus mounted on a vehicle according to claim 1, further comprising:
   a state setting switch operated by a passenger of said vehicle to start or stop said fault determining section.

3. A radar apparatus mounted on a vehicle according to claim 1, further comprising:
   an alarm section outputting an alarm in response to said fault detection signal.

4. A radar apparatus mounted on a vehicle according to claim 1, wherein said fault determining section is always started when said vehicle is started.

5. A radar apparatus mounted on a vehicle according to claim 1, wherein said fault determining section includes:
   a counter for counting movement distance of said vehicle, said counter being reset in response to detection of an object as said detecting result; and
   a determining section for checking whether said counter reaches a predetermined value, and determining that any fault has occurred in said radar unit, and generating said fault detection signal, when said counter reaches said predetermined value.

6. A radar apparatus mounted on a vehicle according to claim 5, wherein said fault determining section further includes:
   a distance switch operated by a passenger of said vehicle to set said predetermined value to one of a plurality of distances which are different from each other.

7. A radar apparatus mounted on a vehicle according to claim 1, wherein said fault determining section includes:
   a counter counting said movement distance of said vehicle when a power spectrum of said reflected radar wave does not contain any component with an intensity larger than a predetermined intensity, said counter being reset when said power spectrum of said reflected radar wave contain any component with an intensity larger than said predetermined intensity; and
   a determining section v checking whether said counter reaches a predetermined value, and determining that any fault has occurred in said radar unit, to generate said fault detection signal, when said counter reaches said predetermined value.

8. A radar apparatus mounted on a vehicle according to claim 7, wherein said fault determining section further includes:
   a distance switch operated by a passenger of said vehicle to set said predetermined value to one of a plurality of distances which are different from each other.

9. A radar apparatus mounted on a vehicle according to claim 1, wherein said radar unit comprises:
   a beam transmitting section for radiating said radar wave, and
   a beam receiving section for receiving said reflected radar wave reflected from an object; and
   said detecting section further includes a position calculating section for calculating said position of said detection object from said radar wave and said reflected radar wave.

10. A radar apparatus mounted on a vehicle according to claim 1, wherein said radar waves include a plurality of radar beams, and said reflected radar waves include a plurality of reflected radar beams,
    said detecting section includes a plurality of channels;
    wherein said detecting section includes means for associating combinations of ones of said plurality of radar beams and ones of said plurality of reflected radar beams with respective ones of said channels, and
    wherein said fault determining section includes means for determining whether any fault has occurred, for every said channel, to generate said fault detection signal.

11. A radar apparatus mounted on a vehicle according to claim 1, wherein said radar waves include a plurality of radar beams, and said reflected radar waves include a plurality of reflected radar beams,
    said radar unit includes:
    a plurality of beam transmitting circuits, each of which radiates one said radar beam; and
    a plurality of beam receiving circuits, each of which receives one said reflected radar beam;
    said detecting section includes a plurality of channels;
    each of said channels is associated with a combination of said radar beam radiated from one of said plurality of beam transmitting circuits and said reflected radar beam received by one of said plurality of beam receiving circuits corresponding to said beam transmitting circuit, or a combination of said radar beam radiated from one of said plurality of beam transmitting circuits and said reflected radar beam received by one of said plurality of beam receiving circuits adjacent to said beam transmitting circuit, and
    said fault determining section includes means for determining whether any fault has occurred, for every said channel, to generate said fault detection signal.

12. A radar apparatus mounted on a vehicle according to claim 11, wherein said detecting section includes means for detecting a position of an object from a power spectrum obtained by synthesizing said radar beams for all said channels other than channels specified by said fault detection signals.

13. A radar apparatus mounted on a vehicle according to claim 1, wherein said fault determining section includes one of an odometer and a trip meter to output said movement distance.

14. A radar apparatus mounted on a vehicle according to claim 1, wherein said fault determining section includes a section calculating a velocity of said vehicle using a Doppler shift quantity between said radar wave and said reflected radar wave, and calculating said movement distance of said vehicle based on said calculated velocity and a time.

15. A method of detecting a fault in a radar apparatus mounted on a vehicle, comprising the steps of:
    detecting objects in a traveling path of said vehicle using radar waves radiated from said radar apparatus toward said traveling path and any of said radar waves which may be reflected from an object in said traveling path back to said radar apparatus;

determining whether any fault has occurred in said radar apparatus, based on a detection result of said detecting step and a movement distance of said vehicle; and generating a fault detection signal, when it is determined that any fault has occurred in said radar apparatus.

16. A method according to claim 15, further comprising:
selecting starting or stopping said determining operation.

17. A method according to claim 15, further comprising:
outputting an alarm in response to said fault detection signal.

18. A method according to claim 15, wherein said determining operation is always started when said vehicle is started.

19. A method according to claim 15, wherein said determining step includes:
counting a movement distance of said vehicle;
resetting a counted value in response to detection of an object;
checking whether said counted value reaches a predetermined value; and
determining that any fault has occurred in said radar unit, to generate said fault detection signal, when said counted value reaches said predetermined value.

20. A method according to claim 19, wherein said determining further includes:
selecting as said predetermined value, one of a plurality of distances which are different from each other.

21. A method according to claim 15, wherein said determining includes:
counting said movement distance of said vehicle when a power spectrum of said reflected radar wave does not contain any component with an intensity larger than a predetermined intensity;
resetting said counted value when said power spectrum of said reflected radar wave contain any component with an intensity larger than said predetermined intensity;
checking whether said counter reaches a predetermined value; and
determining that any fault has occurred in said radar unit, to generate said fault detection signal, when said counted value reaches said predetermined value.

22. A method according to claim 21, wherein said determining further includes:
selecting as said predetermined value, one of a plurality of distances which are different from each other.

23. A method according to claim 15, wherein said radar wave includes a plurality of radar beams, and said reflected radar wave includes a plurality of reflected radar beams,
wherein a combination of one of said plurality of radar beams and one of said plurality of reflected radar beams is associated with a channel, and
wherein said determining includes:
determining whether any fault has occurred, for every channel, to generate said fault detection signal.

24. A method according to claim 15, wherein said radar wave includes a plurality of radar beams, and said reflected radar wave includes a plurality of reflected radar beams,
wherein each of channels is associated with a combination of one of said plurality of radar beams and one of said plurality of reflected radar beams corresponding to said radar beam, or said combination of one of said plurality of radar beams and one of said plurality of reflected radar beams adjacent to said radar beam, and
wherein said determining includes:
determining whether any fault has occurred, for every channel, to generate said fault detection signal.

25. A method according to claim 24, wherein said detecting includes:
detecting a position of said detection object from a power spectrum of said radar beams and said reflection radar beams for all said channels other than channels specified by said fault detection signals.

26. A method according to claim 15, wherein said determining includes:
calculating a velocity of said vehicle using a Doppler shift quantity between said radar wave and said reflected radar wave; and
calculating said movement distance of said vehicle based on said calculated velocity and a time.

* * * * *

UNITED STATES PATENT AND TRADEMARK OFFICE
CERTIFICATE OF CORRECTION

PATENT NO. : 6,414,628 B1
DATED : July 2, 2002
INVENTOR(S) : Jun Ashihara

It is certified that error appears in the above-identified patent and that said Letters Patent is hereby corrected as shown below:

<u>Title page,</u>
Item [56], References Cited, further under FOREIGN PATENT DOCUMENTS, change "0841040" to -- 0840140 --.
Item [57], ABSTRACT,
Line 3, after "using" insert -- a --;
Line 5, after "and" insert -- a --; after "wave" insert -- reflected --;
Line 8, change "detection object" to -- detecting section --.
In the block for reference numeral "54", change "FFI" to -- FFT -- (for "F"ast "F"ourier "T"ransform).

<u>Drawings,</u>
Sheet 3 of 4, in the block reference numeral "54", change "FFI" to -- FFT -- (for "F"ast "F"ourier "T"ransform).

<u>Column 1,</u>
Line 18, change "made a" to -- put to --; change ", to detect" to -- for detecting --.
Line 23, change "the study" to -- a study --.
Line 24, change "is carried" to -- has been carried --; change "to detect" to -- for detecting --.
Line 25, "in a high speed and in" to -- , at a high speed and with --.
Line 27, change "prevent the" to -- prevent --.
Line 29, after "speed" insert a comma.
Line 30, change "a coming" to -- an approaching --; after "vehicle" insert a comma.
Line 39, change "apparatus is" to -- apparatus has been --.
Line 62, after "every" insert -- respective --.
Line 63, change "section and the" to -- and --.
Line 64, change "section" to -- sections --.
Line 65, change "vehicle are" to -- vehicle, is --.
Line 67, change "section and the receiving section" to -- and receiving sections --.

<u>Column 2,</u>
Line 18, after "mounted" insert -- thereon --.
Line 47, change "a passenger" to -- an occupant --.
Line 63, change "the peripheral" to -- a peripheral --.

<u>Column 3,</u>
Line 1, after "using" insert -- a --.
Line 3, before "reflected" insert -- a --; after "wave" insert -- reflected --; change "target" to -- object --.
Line 6, change "object" to -- section --.

UNITED STATES PATENT AND TRADEMARK OFFICE
CERTIFICATE OF CORRECTION

PATENT NO. : 6,414,628 B1
DATED : July 2, 2002
INVENTOR(S) : Jun Ashihara

It is certified that error appears in the above-identified patent and that said Letters Patent is hereby corrected as shown below:

Column 3 cont'd,
Line 11, change "operated by a passenger" to -- operable by an occupant --.
Line 14, after "section" insert -- for --.
Line 25, change "to generate" to -- generates --.
Line 27, before "counter" insert -- different --.
Line 28, change "and a" to -- and --.
Line 37, change "to generate" to -- generates --.
Line 46, before "radiating" insert -- for --.
Line 47, after "receiving section" insert -- for --.
Line 48, change "calculates" to -- calculating --.
Line 49, change "calculating" to -- calculates --.
Line 51, change "includes" to -- may include --.
Line 52, change "includes" to -- may include --.
Line 65, change "channels is" to -- a plurality of channels may be --.

Column 4,
Line 1, change "is associated" to -- may be associated --.
Line 11, change "includes" to -- may include --.
Line 14, after "section" insert -- for --.
Line 18, change "In order" to -- According --.
Line 20, after "by" insert -- : --; change "is using" to -- using a --.
Line 22, before "reflected" insert -- a --; after "reflected radar wave" insert -- reflected --.
Line 23, change "target" to -- object --; delete "and".
Line 25, change "detection object" to -- detecting step --.
Line 26, after "vehicle" change the comma to a semicolon.
Line 30, after "operation" insert -- or step --.
Line 33, change "determining," to -- determining step, --.
Line 36, change "value. It" to -- value, and it --.
Line 41, change "determining," to -- determining step, --.
Line 59, change "determination" to -- determining step --.
Line 64, change "channels is" to -- a plurality of channels may be --.
Line 67, change "is" to -- may be --.

Column 5,
Line 3, change "determination" to -- determining step --.
Line 6, after "detection" insert -- step --.
Line 10, change "determination" to -- determining step --.

UNITED STATES PATENT AND TRADEMARK OFFICE
CERTIFICATE OF CORRECTION

PATENT NO. : 6,414,628 B1
DATED : July 2, 2002
INVENTOR(S) : Jun Ashihara

It is certified that error appears in the above-identified patent and that said Letters Patent is hereby corrected as shown below:

Column 6,
Line 18, change "modulation" to -- modulated --.
Line 20, change "signal radiated" to -- signals radiated --.
Line 32, change "51$a$" to -- 51 --.
Line 36, change "51$a$" to -- 51 --.
Line 49, change "Txa to Txd" to -- TXa to TXd --.
Line 51, change "Txa to Txd" to -- TXa to TXd --.
Line 55, change "Txa to Txd" to -- TXa to TXd --.
Line 57, change "Rxa to Rxd" to -- RXa to RXd --.
Line 58, change "Rxa to Rxd" to -- RXa to RXd --.
Line 60, change "circuit" to -- circuits --.
Line 63, change "Loa to Lod " to -- LOa to LOd --.
Line 64, change "Rxa to Rxd" to -- RXa to RXd --.
Line 65, change "Loa to Lod " to -- LOa to LOd --.
Line 66, change "Bta" to -- BTa --.
Line 67, change "Btd" to -- BTd --.

Column 7,
Line 1, change "Bta to Btd" to -- BTa to BTd --.
Line 4, change "Bta to Btd" to -- BTa to BTd --.
Line 11, change "corresponds" to -- correspond --.
Line numbered between 31 and 32, change "Btab" to -- BTab --.
Line numbered between 32 and 33, change "Btaa" to -- BTaa --; change "Loa" to -- LOa --.
Line 35, change "Btbb" to -- BTbb --.
Line 36, change "Lob" to -- LOb --.
Line 38, change "Btab" to -- BTab --.
Line 39, change "Lob" to -- LOb --.
Line 41, change "Btab" to -- BTab --.
Line 46, change "ch1" to -- CH1 --.
Line 47, change "ch2" to -- CH2 --.

Column 8,
Line 23, change "the position" to -- a position --.
Line 24, change "the fault" to -- a fault --.
Line 31, change "51$a$" to -- 66 --.
Line 34, change "that" to -- whether --.
Lines 42 and 47, change "own" to -- subject --.
Line 56, after "may" insert -- be --.

UNITED STATES PATENT AND TRADEMARK OFFICE
CERTIFICATE OF CORRECTION

PATENT NO. : 6,414,628 B1
DATED : July 2, 2002
INVENTOR(S) : Jun Ashihara

It is certified that error appears in the above-identified patent and that said Letters Patent is hereby corrected as shown below:

Column 9,
Line 24, change "that a" to -- that an occupant --.
Line 25, delete "passenger"; after "see" insert -- and hear --.
Line 26, change "the necessity" to -- necessity --.
Line 32, change "passen-" to -- occupant --.
Line 34, delete "ger"; change "is possible to" to -- can --.
Line 35, change "in the specific" to -- within any specific --.
Line 38, change "Therefore, the" to -- Therefore, any --.
Line 42, change "one" to -- a single value --.
Line 55, change "process of" to -- process for determining --.
Line 59, after "channel" insert -- in --.

Column 10,
Line 23, change "the well" to -- any well --.
Line 31, change "passenger" to -- occupant --.
Line 35, delete "pas-".
Line 36, change "senger" to -- occupant --; after "stops" insert -- operation of --.
Line 40, change "the road" to -- road --.
Line 41, change "environment" to -- environments --.
Line 42, change "exist, when" to -- exist. For example, --;
change "is" to -- may be --.
Line 46, after "can" insert -- thereby --.
Line 48, change "There" to -- there --.
Line 50, change "the usual" to -- a conventional --.
Line 52, change "is operated" to -- may be operated --.
Line 53, after "above" insert -- described fault determining --.
Line 56, after "mode switch" insert -- 68 --.
Line 60, change "distance. " to -- distance). --.

Column 11,
After line 3 and before line 4, insert this paragraph: -- Although there have been described above what are the present embodiments of the invention, it will be understood that variations and modifications may be made thereto without departing from the gist, spirit, or essence of the invention. The scope of the invention is indicated by the appended claims. --.
Line 21, change "operated by a passenger" to -- operable by an occupant -- .
Line 22, change "or stop" to -- and stop operation of --.
Line 26, after "section" insert -- for --.
Line 29, after "wherein" insert -- operation of --.
Line 33, after "counting" insert -- said --.

UNITED STATES PATENT AND TRADEMARK OFFICE
CERTIFICATE OF CORRECTION

PATENT NO. : 6,414,628 B1
DATED : July 2, 2002
INVENTOR(S) : Jun Ashihara

It is certified that error appears in the above-identified patent and that said Letters Patent is hereby corrected as shown below:

Column 11 cont'd,
Line 44, change "operated by a passenger" to -- operable by an occupant --.
Line 49, change "counter counting" to -- counter for counting --.
Line 54, change "contain" to -- contains --.
Line 57, change "v checking" to -- for checking --.
Line 59, change "to generate" to -- and generating --.
Line 65, change "operated by a passenger" to -- operable by an occupant --.

Column 12,
Line 51, after "beams" insert -- and said reflected radar beams --.
Line 60, after "section" insert -- for --.

Column 13,
Line 9, change "comprising:" to -- comprising the step of: --.
Line 10, change "selecting" to -- selectively --; change "operation" to -- step --.
Line 11, change "comprising:" to -- comprising the step of: --.
Line 15, change "operation" to -- step --.
Line 30, after "mining" insert -- step --.
Line 34, after "mining" insert -- step --.
Line 39, change "resetting said" to -- resetting a --.
Line 40, change "contain" to -- contains --.
Line 42, change "counter" to -- counted value --.

Column 14,
Line 5, after "mining" insert -- step --.
Line 11, change "a combination of one" to -- combinations of ones --.
Line 12, change "and one" to -- and ones --.
Line 13, change "is associated" to -- are associated --; change "a channel" to -- respective channels --.
Line 14, before "includes" insert -- step --.
Line 16, before "channel" insert -- said --.
Line 20, before "channels" insert -- a plurality of -- .
Line 23, change "said combination" to -- a combination --.
Line 26, before "includes" insert -- step --.

UNITED STATES PATENT AND TRADEMARK OFFICE
CERTIFICATE OF CORRECTION

PATENT NO. : 6,414,628 B1
DATED : July 2, 2002
INVENTOR(S) : Jun Ashihara

It is certified that error appears in the above-identified patent and that said Letters Patent is hereby corrected as shown below:

<u>Column 14 cont'd,</u>
Line 28, before "channel" insert -- said --.
Line 30, after "ing" insert -- step --.
Line 32, change "reflection" to -- reflected --.
Line 37, after "mining" insert -- step --.

Signed and Sealed this

Eighth Day of April, 2003

JAMES E. ROGAN
*Director of the United States Patent and Trademark Office*